April 8, 1930.  G. M. AGEE  1,754,138
CONTROL VALVE
Filed Jan. 3, 1929  2 Sheets-Sheet 1

Inventor
George M. Agee,
By Cushman, Bryant Darby
Attorneys

April 8, 1930.  G. M. AGEE  1,754,138
CONTROL VALVE
Filed Jan. 3, 1929  2 Sheets-Sheet 2
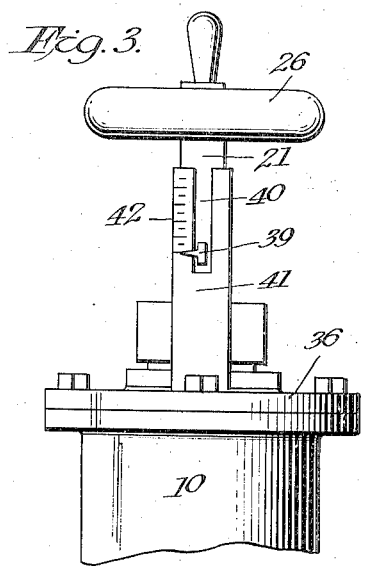
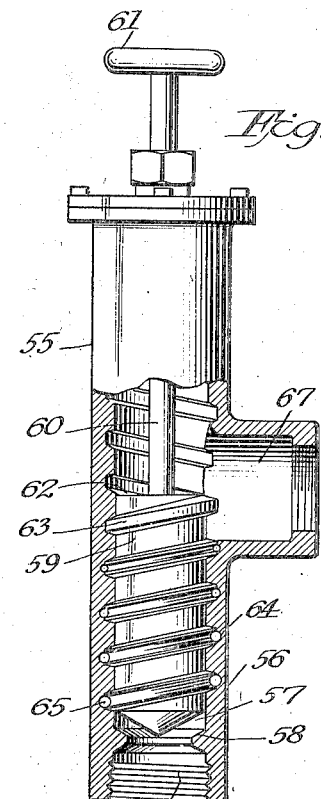
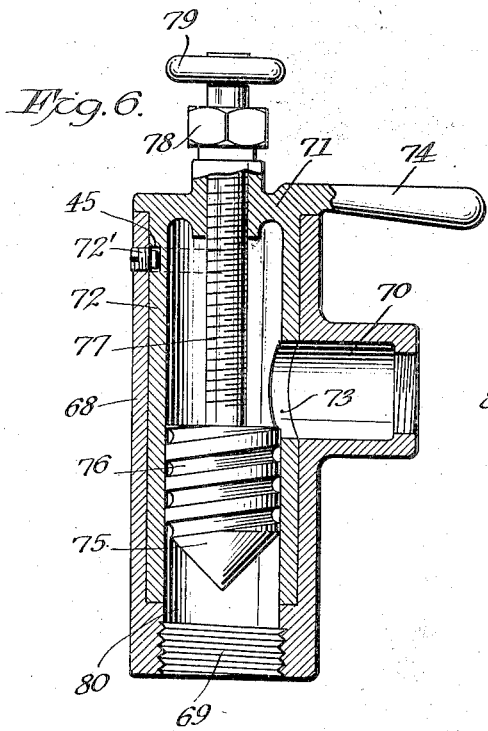
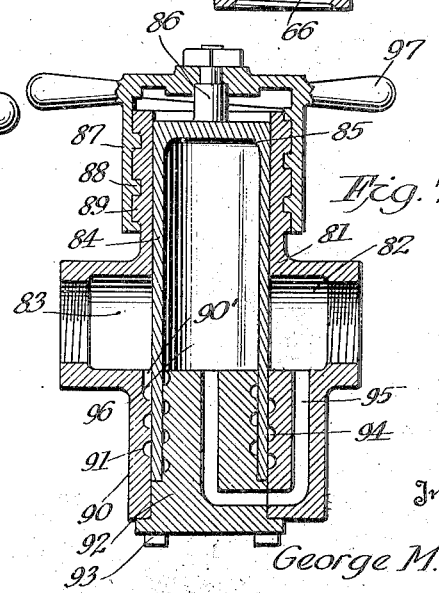
Inventor
George M. Agee Patented Apr. 8, 1930

1,754,138

UNITED STATES PATENT OFFICE

GEORGE M. AGEE, OF OWENSBORO, KENTUCKY

CONTROL VALVE

Application filed January 3, 1929. Serial No. 330,079.

The present invention relates to valves, and more especially to improved means for controlling the supply flow through the body of the valve.

One of the essential objects of the invention is to provide a valve controlling mechanism which may be conveniently regulated to permit either fast or slow flowing fluids or liquids to pass through the body of the valve.

Another object of the invention is to provide a valve body with a main supply passage for permitting a maximum flow of the supply when the valve is completely opened, and a supplemental or auxiliary passage so associated with the main supply passage and the valve as to allow a reduced flow of the supply to pass through the valve body when the main supply is closed.

A further object comprehends the provision of a simple, efficient and inexpensive valve construction in which the supply flow will be controlled by the length of the supply passage instead of the size of the inlet or outlet opening.

A still further object is to provide a valve control means which may be efficiently employed for regulating the flow of fluids and liquids which, when cold, require a large and full size opening of the valve and which, when warm, or at average temperatures, requires a very small valve opening.

An additional feature of the invention consists in associating an external indicator with the valve stem so as to register the distance the valve is moved relative to its seat in order to permit the adjustment of the valve when used with liquids whose viscosity is effected by changes in temperature.

Other objects and advantages of the invention will become apparent from the following description and claims when taken in conjunction with the accompanying drawings.

Referring to the drawings in which is shown several preferred embodiments of the invention:

Figure 3 is a detail side view of the upper portion of the valve showing the indicator and its associated parts.

Figure 5 is a side view partly in section of a further modification.

Figure 6 is a vertical sectional view of another modification.

Figure 7 is a vertical sectional view of a still further modification.

Figure 1:
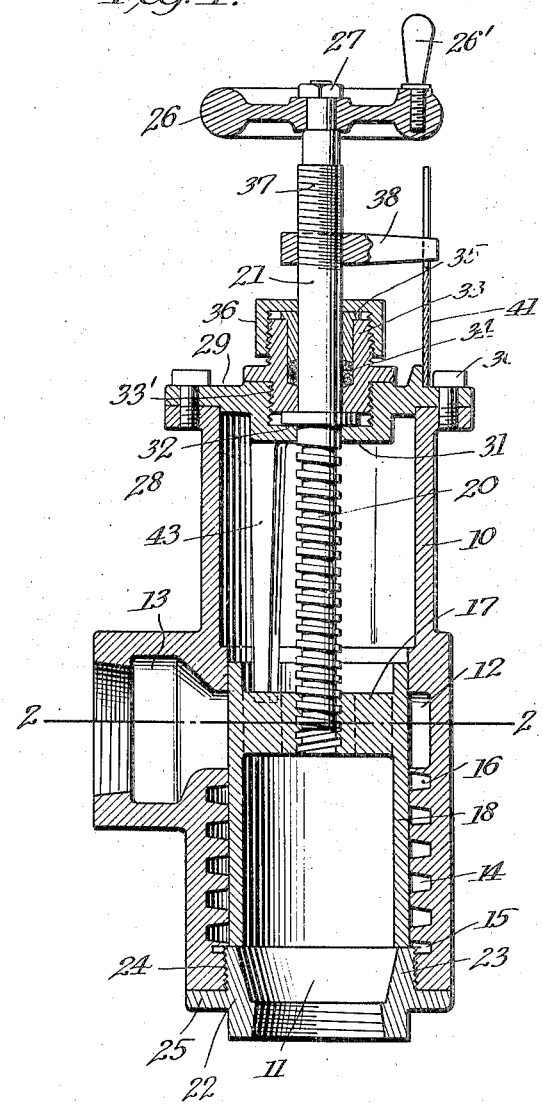
Figure 1 is a vertical sectional view of a valve constructed in accordance with my invention.
Figure 2:
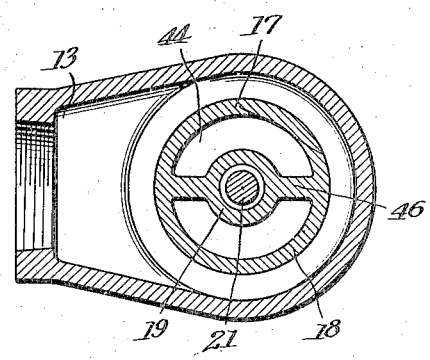
Figure 2 is a sectional view taken substantially along the line 2—2 of Figure 1.

Referring to the drawings in which like numerals indicate like parts in the several views, 10 denotes a valve body having an inlet supply passage 11 that communicates with a recessed chamber 12, which, in turn, communicates with the angularly disposed outlet supply passage 13. The wall of the valve body surrounding the upper portion of the inlet supply passage 11 is preferably formed with a spiral passage 14 that is adapted to communicate with the inlet supply 11, said passage having its upper end 16 communicating with the chamber 12. A reciprocating valve 17 is preferably formed with a hollow skirt portion 18, and has a medially disposed threaded boss 19 (Fig. 2) which receives the threaded portion 20 of the valve stem 21. A removable valve seat 22 has an external threaded portion 23 which engages the internal threads 24 formed in the wall of the inlet passage 11, and also has an annular flange 25 for limiting its inward movement into the valve body. As shown in Figure 1, the skirt 18 of the valve 17 coacts with the valve seat 22 for closing communication between the inlet supply 11 and the lower portion 15 of the spiral passage 14, and also prevents the inlet supply from passing directly to the chamber 12 and the outlet 13 until the lower portion of the skirt 18 has passed above the chamber 12. As soon as the valve skirt 18 is raised to expose the lower end of the spiral passage 14 to the inlet supply 11, the supply will circulate through the spiral passage 14 up to and through the chamber 12 and the outlet 13. The main supply, however, will be cut off by the valve 17 from the chamber 12 until the skirt has passed above the sides of the chamber 12.

The valve 17 is preferably actuated by a manually operating wheel 26 having a handle 26' which is connected to the outer end of the valve stem 21 by the nut 27, but may be connected to any suitable means for automatic or power actuation. The upper portion of the valve body 10 has a housing 28 for receiving the valve 17 when the latter is being moved to its completely opened position. A cap or bonnet 29 is secured to the housing 28 by the threaded bolts 30, and has a central hollow boss 31 through which the smooth portion of the valve stem 21 extends. An annular flange or collar 32 on the valve stem 21 is confined between the lower portion of the boss 31 and a plug 33 that is threaded to said boss, as at 33'. The plug 33 has a recess for receiving the packing 34 and the follower 35 that is clamped in position by the threaded nut 36 connected to the plug 33.

In order to indicate the distance the valve 17 is moved from its closed position, the outer portion of the stem 21 is provided with the threads 37 to which is movably connected an arm 38 that has an indicator finger 39 (Fig. 3) which is axially movable in a slot 40 formed in a scale bar 41 secured to the top of the cap 36. The bar 41 on one side of the slot 40 has a scale 42 for registering the axial movement of the valve 17 relative to its seat 22. In order that the indicator 39 will accurately register on the scale 42, the axial displacement of the valve 17, the lower threaded portion 20 of the valve stem 21 is threaded four threads to the inch, while the threads 37 are threaded sixteen threads to the inch so as to give a ratio of four for the valve 17 to one of the indicator fingers 39.

The cap 29 is preferably provided with a depending arm 43 which extends into one of the curved slots 44 (Fig. 2) formed by the web 46 so as to prevent rotation of the valve 17 when it is being moved to its opened or closed position.

Assuming that the valve is used for controlling the supply of a fluid or liquid whose viscosity is affected by temperature changes, such as molasses or the like, it will be observed that the valve 17 is in its closed position as shown in Figure 1, and that upon the rotation of the wheel 26, the valve stem 21 will cause the skirt 18 to be raised to allow the fluid to pass from the inlet 11 to the spiral passage 14 from where it is conducted to the chamber 12 and delivered to the outlet 13. Upon further upward movement of the valve 17, the supply passage may be completely open to permit a full flow of the fluid from the inlet to the outlet. Should it be desired to maintain a definite and uniform flow of the supply, the valve 17 may be set by the indicator 38 at any predetermined distance above the valve seat 22 so as to regulate the flow through the valve body.

The valve skirt 18 when slightly raised from its seat coacts with the spiral passage 14 to reduce the pressure of the supply, thereby tending to eliminate the clogging of the spiral passage due to the crystallization or tendency of the fluid to adhere to the walls of the body when passing therethrough. It will be seen that the flow of the supply is controlled by varying the length of the passage presented by the valve instead of being controlled by the size of the valve opening as is the case with the needle type of valve. Furthermore, the valve 17 and its associated parts are so arranged and constructed as to permit the outlet opening to be larger than the inlet opening, thus avoiding any possibility of the supply passage becoming obstructed or otherwise impaired, due to the failure of the liquid to pass freely through the valve body.

Figure 4:
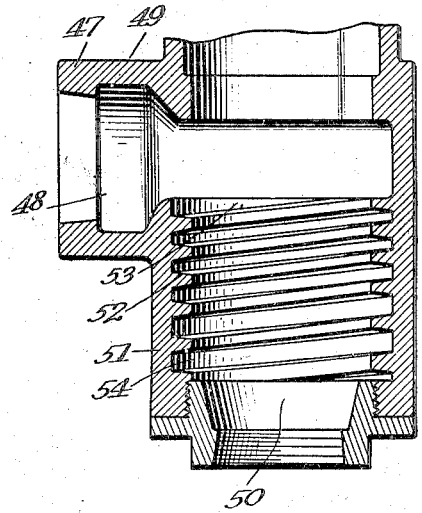
Figure 4 is a detail sectional view of a modified form of the invention.

Referring to the form of the invention illustrated in Figure 4, the valve body 47 is slightly different in construction from the valve body 10, in that it has its inlet 48 formed in the horizontal portion 49, and its outlet 50 arranged in the vertical portion 51 of the valve body, thus showing that either of these passages may be used as the inlet or outlet. Additionally, the spiral passage 52 is tapered so as to increase in area from its inlet 53 to its outlet 54. Otherwise, the construction of the valve and its associated parts are substantially the same as that shown and described in Figure 1. In this construction, it might be noted that the spiral passage formed in the wall of the valve body may be of uniform area, or of gradual increasing or decreasing area from the inlet to the outlet as the best operating conditions may determine.

In the form of the invention illustrated in Figure 5, the valve body 55 has a vertical portion 56 formed at its lower end with a supply passage 57 and a valve seat 58, which seat coacts with a valve 59, that is connected by its stem 60 to an operating handle 61. The inner wall of the vertical portion of the valve 55 is formed with a spiral groove 62 arranged to receive the complementary spiral thread 63 on the periphery of the valve 59. The groove 62 which extends into the supply passage 57 is preferably curved and of progressively decreasing area as indicated at 64, while the complementary thread 63 is similarly formed with a progressively decreasing curved passage 65 so as to constitute a circular passage that effects a gradual reduction of the flow from the inlet 66 to the angularly disposed outlet 67 when the supply is conducted therethrough. Otherwise, the operation of the valve is substantially similar to that shown in Figure 1.

In the form of the invention disclosed in

Figure 6, the valve body 68 has an inlet 69 and an outlet 70, the supply through which is controlled by a rotary valve 71 having a depending sleeve 72 provided with a lateral opening 73 arranged to register with the outlet supply 70. Axial movement of the valve 71 is prevented by means of the locking pin 72' which extends through the valve body into an annular groove 45 in the outer periphery of the sleeve 72. An operating handle 74 extends from the valve 71, so as to move the opening 73 into and out of registration with the outlet opening 70. A supplemental valve 75 is formed with a spiral passage 76, and has a threaded valve stem 77 which extends through the top of the main valve 71, and is connected thereto by the nut 78. An operating wheel 79 is secured to the outer end of the valve stem 77 so as to move the valve 75 axially in the depending sleeve 72. It will be seen that when a reduced flow of fluid is desired to be passed through the valve body 68, the valve opening 73 is brought into registration with the outlet 70 by the actuation of the valve handle 74, and the supplemental valve 75 is raised the desired distance by the manipulation of the wheel 79. When a full flow of the supply is desired, the supplemental valve 75 is moved above the opening 73, thus allowing an uninterrupted flow through the valve body.

In the modification illustrated in Figure 7, the valve body 81 has horizontally aligned inlet openings 82 and 83 arranged to be cut off from each other by the depending skirt 84 of the valve 85, which valve is vertically actuated by means of its connection 86 to a sleeve 87 that is internally threaded as at 88, so as to engage the complementary external threads formed in the upper tubular portion 89 of the valve body. The valve body 81 is further provided with a depending hollow portion 90 having a spiral passage 91 which communicates with the outlet port 83 as at 90', and receives a plug 92 that is suitably secured to the bottom of the valve body by the bolts 93. The plug 92 has a spiral passage 94 arranged to be separated from the complementary passage 91 in the valve body by the skirt 84 when the valve is in its closed position. An auxiliary reduced passage 95 formed in the adjacent portions of the valve body 90 and the plug 92 communicates with the inlet 82, and a passage 96 formed by the skirt 84 of the valve when the latter is in its closed position. As shown, the valve 85 is moved so as to completely cut off the supply from the inlet 82 to the outlet 83. However, the supplemental passage 95 permits communication of the inlet 82 with the passage 96. When the main valve 85 is raised a sufficient distance by the actuation of the sleeve 87, which is effected by the turning of the wheel 97, the skirt 84 is moved above the lower portion of the passages 94 and 91, so as to establish communication therebetween, and thus permit a reduced flow of the supply to pass from the inlet 82 to the outlet 83. Of course, upon movement of the skirt 84 above the inlet and outlet passages, a complete flow of the supply is permitted to pass through the valve body.

It will be seen that the invention is admirably suited for controlling the supply of liquids whose viscosity is affected by changes in temperature, such as molasses or the like. Moreover, it can be effectively employed for handling paints, varnishes, pitch, and crude oils for burners and the like. Additionally, it may be used in handling refuse oil or waste liquids that contain a large quantity of dirt or sediment without danger of the passages becoming clogged.

By reason of the length of the spiral passage in the valve body, the pressure of the supply will be automatically reduced as it enters the valve body, thus obtaining a low volume supply without the injurious freezing effect which usually takes place with ordinary types of valves when the high pressure drops to atmospheric pressure.

The forms of the invention herewith shown and described are merely illustrative of preferred embodiments, and such changes and modifications may be made therein as fall within the purview of one skilled in the art without departing from the spirit of the invention and the scope of the appended claims.

I claim:

1. In a valve of the class described, a valve body having a main supply passage and a supplemental supply passage, inlet and outlet openings communicating with said passages, and a valve for controlling the supply through said passages and for permitting the supply to pass from said inlet to said outlet openings through said supplemental passage when the main passage is closed by said valve.

2. In a valve of the class described, a valve body having a main supply passage, and a supplemental supply spiral passage surrounding said main supply passage, inlet and outlet openings communicating with said passages, and a valve controlling the supply through said passages and for permitting the supply to pass from said inlet to said outlet openings through said spiral passage when the main passage is closed by said valve.

3. In a valve of the class described, a valve body having a chamber formed therein, inlet and outlet passages communicating with said chamber, a supplemental passage in said body communicating with the inlet and outlet passages, a valve mounted in said body for controlling the supply through said chamber and through said supplemental passage, and comprising means which upon the raising of the valve within predetermined limits maintains the valve closed relative to the main supply through said chamber and permits the supply to pass through said supplemental passage.

4. In a valve of the class described, a valve body having a chamber formed therein, inlet and outlet passages communicating with said chamber, a spiral passage in said body communicating with the inlet and outlet passages, a valve mounted in said body for controlling the supply through said chamber and through said spiral passage, and means which upon the raising of the valve within predetermined limits maintains the valve closed relative to the main supply through said chamber and permits the supply to pass through said spiral passage.

5. In a valve of the class described, a valve body having a main supply passage and an auxiliary supply passage, a valve controlling the supply through said passages, said valve adapted to coact with said passages to permit a full flow through the main supply passage and a reduced flow through the auxiliary passage when the main supply passage is closed, and means for adjusting said valve to maintain a uniform reduced flow of the supply through the valve body.

6. In valve of the class described, a valve body having a main supply passage and an auxiliary supply passage, a valve controlling the supply through said passages, said valve adapted to coact with said passages to permit a full flow through the main supply passage and a reduced flow through the auxiliary passage when the main supply passage is closed, seat valve comprising means operable by the axial movement of said valve for varying the reduced flow of the supply passing through the valve body.

7. In a valve of the class described comprising a valve body having an angularly disposed passage, inlet and outlet openings, said valve body having a chamber formed at the juncture of said inlet and outlet openings, a valve for controlling the main supply to said chamber, a spiral passage formed in the wall of said body and adapted to communicate the inlet opening with said chamber, said valve having a depending portion arranged to control the supply through said spiral passage, and upon being raised within predetermined limits to maintain the main supply closed and permit a reduced supply to pass through said spiral passages to said chamber.

8. In a valve of the class described, a valve body having a main supply passage and a spiral auxiliary supply passage surrounding the main passage, angularly disposed inlet and outlet openings communicating with said passages, said body having a valve seat below said spiral passage, a valve controlling the supply through said valve seat, and comprising means which upon the raising of the valve within certain predetermined limits permits the supply to pass through said spiral passage to the outlet opening and maintains the main supply passage closed.

9. In a valve of the class described, a valve body having a main supply passage and a spiral auxiliary supply passage surrounding the main passage, angularly disposed inlet and outlet openings communicating with said passages, said body having a valve seat below said spiral passage, a reciprocating valve controlling the supply through said valve seat, said valve having a threaded stem extending beyond the valve body, a scale associated with said body, and means movably connected to said stem for indicating on said scale the axial movement of said valve relative to the valve seat.

10. In a valve of the class described, a valve body having a main supply passage and a spiral auxiliary supply passage surrounding the main passage, angularly disposed inlet and outlet openings communicating with said passages, said body having a valve seat below said spiral passage, a reciprocating valve controlling the supply through said valve seat, said valve having a threaded stem extending beyond the valve body, a scale bar connected to said valve body, an arm movably connected to said stem and associated with said scale bar for indicating the movement of said valve relative to the valve seat, and means for maintaining the valve in a predetermined position.

11. In a valve of the class described, a valve body having a main supply passage and a supplemental supply passage, inlet and outlet openings communicating with said passages, a reciprocating valve for controlling the supply through said passages, said valve having a threaded stem extending beyond the valve body, a scale connected to said valve body, a bar movably connected to said stem and associated with said scale to indicate the axial movement of said valve, said valve comprising means for permitting the supply to pass from said inlet to said outlet openings through said supplemental passage when the main passage is closed by said valve.

12. In a valve of the class described, a valve body having a vertical passage and a horizontal passage, a chamber formed in said vertical passage and communicating with said horizontal passage, a valve seat in the lower portion of said vertical passage, a spiral groove formed in said vertical passage and communicating with said chamber, a reciprocating valve mounted in said vertical passage and having an annular depending skirt adapted to engage said valve seat for controlling the flow of the supply to said spiral groove, the sides of said skirt acting as a closure for controlling direct communication of the supply with said chamber, a cap closing the top of said vertical passage and connected to said valve body, a threaded valve stem having a smooth portion extending through said cap and threadedly connected to said valve, a handle connected to said stem for moving the valve axially, a scale connected to said valve body, a finger movably connected to said valve stem and associated with said scale for indicating the movement of the valve relative to the valve seat.

In testimony whereof I have hereunto set my hand.

GEORGE M. AGEE.